(12) United States Patent
Kass et al.

(10) Patent No.: US 9,275,161 B2
(45) Date of Patent: Mar. 1, 2016

(54) ENTERPRISE ACTIVITY PATTERN ANALYSIS SYSTEM

(71) Applicant: Accenture Global Services Limited, Dublin (IE)

(72) Inventors: Alex Kass, Palo Alto, CA (US); Sunil Shettigar, Sunnyvale, CA (US); Taemie Kim, Palo Alto, CA (US); Mary Catherine Thomas, Kochi (IN)

(73) Assignee: Accenture Global Services Limited, Dublin (IE)

( * ) Notice: Subject to any disclaimer, the term of this patent is extended or adjusted under 35 U.S.C. 154(b) by 61 days.

(21) Appl. No.: 13/836,071

(22) Filed: Mar. 15, 2013

(65) Prior Publication Data

US 2014/0081959 A1 Mar. 20, 2014

Related U.S. Application Data

(60) Provisional application No. 61/702,216, filed on Sep. 17, 2012.

(51) Int. Cl.
| | |
|---|---|
| *G06F 17/30* | (2006.01) |
| *H04L 29/06* | (2006.01) |
| *H04L 29/08* | (2006.01) |
| *G06Q 50/00* | (2012.01) |

(52) U.S. Cl.
CPC .... *G06F 17/30896* (2013.01); *G06F 17/30867* (2013.01); *G06Q 50/01* (2013.01); *H04L 65/403* (2013.01); *H04L 67/22* (2013.01)

(58) Field of Classification Search
CPC .................................. G06F 17/30896
USPC ........................................ 707/723
See application file for complete search history.

(56) References Cited

U.S. PATENT DOCUMENTS

| | | | |
|---|---|---|---|
| 6,065,009 | A | 5/2000 | Leymann et al. |
| 7,526,459 | B2 | 4/2009 | Flinn et al. |
| 7,895,209 | B2 | 2/2011 | Spence et al. |
| 8,145,678 | B2 | 3/2012 | Ramsay, Jr. et al. |

(Continued)

FOREIGN PATENT DOCUMENTS

| | | |
|---|---|---|
| EP | 1619618 A1 | 11/2011 |
| EP | 1699009 A1 | 8/2012 |

OTHER PUBLICATIONS

Salesforce.com Unveils Salesforce Chatter—Enterprise Collaboration Meets the Real-Time Social Computing Model Loved by Millions on Facebook and Twitter—http://www.prnewswire.com/news-releases/salesforcecom-unveils-salesforce-chatter---enterprise-collaboration-meets-the-real-tirne-social-computing-model-loved-by-millions-on-facebook-and-twitter-7037424.2.html, dated Jan. 22, 2013, (4p).

(Continued)

*Primary Examiner* — Huawen Peng
(74) *Attorney, Agent, or Firm* — Brinks Gilson & Lione

(57) ABSTRACT

An enterprise activity pattern analysis system retrieves log data from a social networking system. The log data includes information characterizing user interactions with a team group space hosted by, or document uploaded to, the social networking system. The system analyzes the log data to detect patterns in the user interactions. The system embeds widgets into the group space and into the documents uploaded to the social networking system that provide visual representations of the pattern analysis.

15 Claims, 14 Drawing Sheets

(56) References Cited

U.S. PATENT DOCUMENTS

| | | | |
|---|---|---|---|
| 8,301,477 | B2 | 10/2012 | Allam et al. |
| 8,768,751 | B2 | 7/2014 | Jakowski et al. |
| 8,768,764 | B1 | 7/2014 | Paharia |
| 2002/0023176 | A1 | 2/2002 | Kwicinski |
| 2002/0157017 | A1 | 10/2002 | Mi et al. |
| 2003/0061330 | A1 | 3/2003 | Frisco et al. |
| 2003/0078874 | A1 | 4/2003 | Cope |
| 2003/0090514 | A1 | 5/2003 | Cole et al. |
| 2004/0143477 | A1 | 7/2004 | Wolff |
| 2004/0183829 | A1 | 9/2004 | Kontny et al. |
| 2004/0186762 | A1 | 9/2004 | Beaven et al. |
| 2005/0027585 | A1 | 2/2005 | Wodtke et al. |
| 2005/0095569 | A1 | 5/2005 | Franklin |
| 2006/0195778 | A1 | 8/2006 | Bendik |
| 2007/0100875 | A1* | 5/2007 | Chi et al. ............... 707/102 |
| 2007/0124185 | A1 | 5/2007 | Elkin et al. |
| 2007/0162324 | A1 | 7/2007 | Suzuki et al. |
| 2007/0162907 | A1 | 7/2007 | Herlocker et al. |
| 2007/0276714 | A1 | 11/2007 | Beringer |
| 2008/0004927 | A1 | 1/2008 | Haller et al. |
| 2008/0091496 | A1 | 4/2008 | Gurpinar et al. |
| 2008/0127041 | A1 | 5/2008 | Gura |
| 2008/0155425 | A1 | 6/2008 | Murthy et al. |
| 2008/0183538 | A1 | 7/2008 | Hamadi et al. |
| 2008/0228774 | A1 | 9/2008 | Hamilton et al. |
| 2008/0229213 | A1 | 9/2008 | Hamilton et al. |
| 2008/0229214 | A1 | 9/2008 | Hamilton et al. |
| 2008/0312992 | A1 | 12/2008 | Hoshi et al. |
| 2009/0112655 | A1 | 4/2009 | Stuhec et al. |
| 2009/0138257 | A1 | 5/2009 | Verma et al. |
| 2010/0057682 | A1 | 3/2010 | Ramsay et al. |
| 2010/0121859 | A1 | 5/2010 | Maeda et al. |
| 2010/0262557 | A1 | 10/2010 | Ferreira et al. |
| 2011/0137702 | A1 | 6/2011 | Hodges et al. |
| 2011/0179045 | A1 | 7/2011 | Caldwell et al. |
| 2011/0288897 | A1 | 11/2011 | Erhart et al. |
| 2012/0215705 | A1 | 8/2012 | Porro et al. |
| 2012/0216125 | A1 | 8/2012 | Pierce |
| 2013/0073280 | A1* | 3/2013 | O'Neil et al. ............... 704/9 |
| 2013/0073343 | A1 | 3/2013 | Richardson et al. |
| 2014/0025441 | A1 | 1/2014 | Eberlein et al. |

OTHER PUBLICATIONS

LeFebvre, Richard, "*Online Media Daily: Oracle Takes Social Marketing Seriously*", Oracle CRM EMA Partner Community, Nov. 19, 2012, (1p).

Oracle Social Network—An Oracle White Paper, Oct. 2011. http://www.oracle.com/technetwork/middleware/webcenter/socialnetwork/overview/wp-oracle-social-network-2011-513258.pdf, (18p).

Salesforce Radian6—Insights—Social Media is a Big Data—http://www.radian6.com/what-we-sell/marketingcloud/analysis-insights/, Jan. 22, 2013, (1p).

Salesforce Radian6—Engagement Console—Engagement Console, http://www.radian6.com/what-we-sell/marketingcloud/analysis-insights/ , Jan. 22, 2013, (4p).

Salesforce Radian6—Workflow and Automation—http://www.radian6.com/what-we-sell/marketingcloud/analysis-insights/, Jan. 22, 2013, (2p).

Social Ads—Amplify your content, Jan. 22, 2013, (1p).

Salesforce Social Hub—Transform Your Business into a Socially Connected Enterprise, Jan. 22, 2013, (2p).

Data Super Friends: Can Social Medial and Enterprise Applications Team Up?—http://webcachegoogleusercontent.com/search?q=cache:6OyJ4dxjL6YJ:http://gigaom . . . , dated Jan. 22, 2013, (8p).

OfficeXta—Social Enterprise Collaboration Platform—https://www.officexta.com/tag/features.do?p=1, dated Jan. 22, 2013, (2p).

SnapLogic—Social Media Integration: Cloud Data Integration Tools & Solutions—http://www.snaplogic.com/what-we-do/solutions/social-media-integration.php, dated Jan. 22, 2013, (1p).

SocialCast—Enterprise Social Networking, Enterprise Collaboration—http://www.socialcast.com/product, dated Jan. 22, 2013, (3p).

SocialCast—Integrat Business Applications with Enterprise Social—http://www.socialcast/com/social-network-integration, dated Jan. 22, 2013, (2p).

Social Cast—Enterprise Social Networking Software & Activity Stream—http://www.socialcast.com/enterprise-social-network, dated Jan. 22, 2013, (2p).

SAP Social Software—Video: Social Learning with SAP Jam and SuccessFactors Learning Management System by David Brockington (Dec. 12, 2012)—http://scn.sap.com/community/socialsoftware/blog, dated Jan. 22, 2013, (14p).

Social Media Analysis Software—CRM Software-SAP—Make Social Media Platforms an Asset to Your Organization With Our Social Media Analysis Software—http://www54.sap.com/lob/customer-service/software/social-media-analytics/index.html, dated Jan. 22, 2013, (1p).

Facebook for the Enterprise—http://www.appirio.com/products/facebookconnect.php, dated Jan. 22, 2013, (1p).

Appirio Helps Businesspeople Connect the Facebook Platform to Salesforce CRM—http://press.appirio.com/2008/10/appirio-helps-businesspeople-connect.html, dated Jan. 22, 2013, (2p).

Yammer: What is Yammer—The First and Most Powerful Enterprise Social Network—https://www.yammer.com/product/, dated Jan. 22, 2013 (2p).

Yammer: Yammer Platform—What is Yammer—Integrate Your Business Applications—https://www.yammer.com/product/features/yammer-platform/, dated Jan. 22, 2013, (3p).

Gamification 101: An Introduction to the Use of Game Dynamics to Influence Behavior, White Paper Bunchball Inc,, Oct. 2010, retrieved online on Mar. 18, 2015 from http://bunchball.com/sites/default/files/downloads/gamification101.pdf, 14 pages.

European Search Report for EP Application No. 11183845.4 dated Dec. 30, 2011 (7p).

Office Action for U.S. Appl. No. 12/537,830 dated Mar. 21, 2012 (15p).

Office Action for U.S. Appl. No. 12/537,830 dated Aug. 28, 2012 (16p).

First Examiner's Report for Australian Application No. 2010206022, dated Mar. 30, 2011 (3p.).

Korba et al., "Automated social network analysis for collaborative work." (2006). 10 pages.

Wellman, "Computer networks as social networks." Science 293. 5537 (2001): 2031-2034.

Fisher et al., "Social and Tempural structures in everyday collaboration." Proceedings of the SIGCHI conference on Human factors in computing systems. ACM, 2004. 8 pages.

Dutra et al., "Using an Inference Engine to Detect Conflicts in Collaborative Design." 14th International Conference on Concurrent Enterprising (ICE 2008)—Lisbon, Portugal, 2008. 8 pages.

* cited by examiner

200 accenture

| Activity | Inbox | Alerts | People | Places | Content | Apps | / Create |

Enterprise Social Collaboration Group Space in Digital Experience R&D Group

Overview | Contact | People | Subspaces and Projects | Reports

The Enterprise Social Collaboration R&D Group is focused on exploring how organizations can leverage social collaboration tools to improve the way enterprise knowledge work gets done.

To see more of our white papers and thoughleadership, check out our shared documents at the Social Collaboration Initiative Front Porch space.

Start Something

| Action | Type |
|---|---|
| Create a task | Admin | Relationship | Thought Leadership | Programing | IP protection | Proposal Writing | Other |
| Log an accomplishment | Admin | Relationship building | Thought leadership | programing | Intellectual Property | Other |
| Log a meeting | team meeting | Accenture partner meeting | External meeting |
| Create a project | click |
| Start a discussion | About a Client | About an Asset | other | About News |
| Create a Dossier | Client Dossier | Vendor Dossier | other Dossier |
| Create a Document | Project Planning | Project Description | Thought Leadership | Demo or Demo Script |

Activity stream for social collaboration group space

Jan 25, 2012 4:36 PM
manish mehta made a comment "I think this looks good. I am assuming 1.29 will be yours till ASCOT ... [+]

Jan 25, 2012 4:01 PM
Chan Dang made a comment "great suggestions, I'll send you another draft asap"

Jan 25, 2012 4:00 PM
manish mehta made a comment " A few comments on this one. Minor detailing things: a) ) I will suggest ligh ...[+]

Jan 25, 2012 3:54 PM
Chan Dang created a document "Gamificatsc6_25.pptx"

Jan 25, 2012 3:52 PM

202

Contributors to this space

● Most frequently worked on   ○ Recent

- Action-Oriented Social Collaboration Vision_TGP Sales C...
- LinkedInRecipes.pptx
- 200px-RubeusHagrid.jpg
- On going efforts
- Jwe based ESC Demos
- Chatter based ESC Demos
- FY13 Enterprise Collaboration RD Group OBT_round 1
- Intelligent Social Hub.vsd
- Requirements Traceability Matrix - Chatter What is this team working on?

Figure 2

What is this team working on? — 404 On going efforts

- 406 LinkedInRecipes.pptx
- 408 200px-RubeusHagrid.jpg
- Action-Oriented Social Collaboration Vision_TGP Sales Campaign -AK 410, 412, 414, 410, 416, 412, 410, 410

402

Popular Content
- Action-Oriented Social CollaborationVision_TGP Sales Campaign -AK
- Social Collab Group FY12 Overview
- 4 goals of social collaboration
- Jive based SC Demos
- LinkedInRecipes.pptx

400

Chau Dang created a document: __25.pptx

Jun 25, 2012 3:52 PM
manish mehta made a comment: "I think the overall structure looks good. Few comments a) It would be good... [+]"

Jun 25, 2012 3:16 PM
Chau Dang made a comment " i forgot a "next" button on the review window Will put that in now"

Jun 25, 2012 11:35 AM
Alex Kass updated the document: "Action-Orientated Social Collaboration Vision_TGP Sales Campaign , AK"

Jun 25, 2012 11:09 AM
Alex Kass updated the document: "links"

Jun 25, 2012 11:06 AM
Alex Kass created a document: "links"

Jun 25, 2012 11:02 AM
Alex Kass updated the task: "next interation of project description"

Jun 25, 2012 10:25 AM
Alex Kass made a comment: "Thanks for setting this up. Let's see if this kind of thing is helpful I... [+]"

Jun 25, 2012 8:56 AM
Alex Kass made a comment: "I have made a couple of changes from Mary's original: I moved the "new... [+]"

ESC Recent accomplishments
- Comment tagged with accomplishment, esc
- Finalize Proposal for Small Telecom Client
- Presented on our Enterprise Social Collaboration Vision to the Institute for High Performance Global
- setup a call with Andrew
- Present collab at NEADS workshop
- Create slide detailing out the revised FY12 plan discussed on last Friday

What Matters: Activity

What's going on?
Last status update: Liking new "My Profile" on the home page 0

Recommendations | All Activity
All Followed | Matters Most | Status Updates Only | Hidden "abnormalities in experiment XYZ"
because it has been viewed by many of your team members
in Panelists & Keynote Speakers. 0 comments 1 new "results of experiment ABC"
because there has been multiple edits since the last time you viewed it
in Digital Experience Reporting. 0 comments 1 new "questions on experiment HIJ"
because there has been significant edits since the last time you viewed it
in Interest Graph. 0 comments 1 new Results on experiment HIJ"
because it is close to completion
in International Woman's Day. 0 comments 1 new Questions on experiment HIJ"
because it is of team B, a team that you closely follow Recommended For You Daily Status
last modified 5 hours ago by
in Callan's Digital Desk
Workstreams/Deliverables Intent Marketing demo deck (2/29) vendor profiles & intent mapping engine options (3/2) Next Steps from last Weekly Status Complete 1st Draft of Instara Demo Deck - 2/29/12 Complete initial ven...
⊖ Remove  ⊗ Not Interested  ⊙ Why?

Trending Content

IWD FY12 Day-Of Logistics
0 Likes 0 comments

DE Status FY12 #13
0 Likes 0 comments

SP057 Assumptions Log
0 Likes 0 comments

Instara Demo Deck v1
0 Likes 0 comments

Dyson_RFP_Front_Office_Proposer_Response_
(Final) 09022012

1400
1402
1404

Activity | Inbox | Alerts | People | Places | Apps | Create

Welcome
Search

ENTERPRISE ACTIVITY PATTERN ANALYSIS SYSTEM

PRIORITY CLAIM

This application claims priority to U.S. Provisional Patent Application No. 61/702,216, filed Sep. 17, 2012, which is incorporated herein by reference.

TECHNICAL FIELD

This application relates to electronic collaboration tools and applications. In particular, this application relates to embedding collaborative social networking components into electronic client applications.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

FIG. 2 shows an example of an enterprise social group space built on a social collaboration system enhanced with a custom widget.

FIG. 4 shows another example of an enterprise social group space built on a social collaboration system enhanced with a custom widget.

FIG. 14 shows recommendations widget that may be embedded into a group space built on a social networking platform.

DETAILED DESCRIPTION

Figure 1:
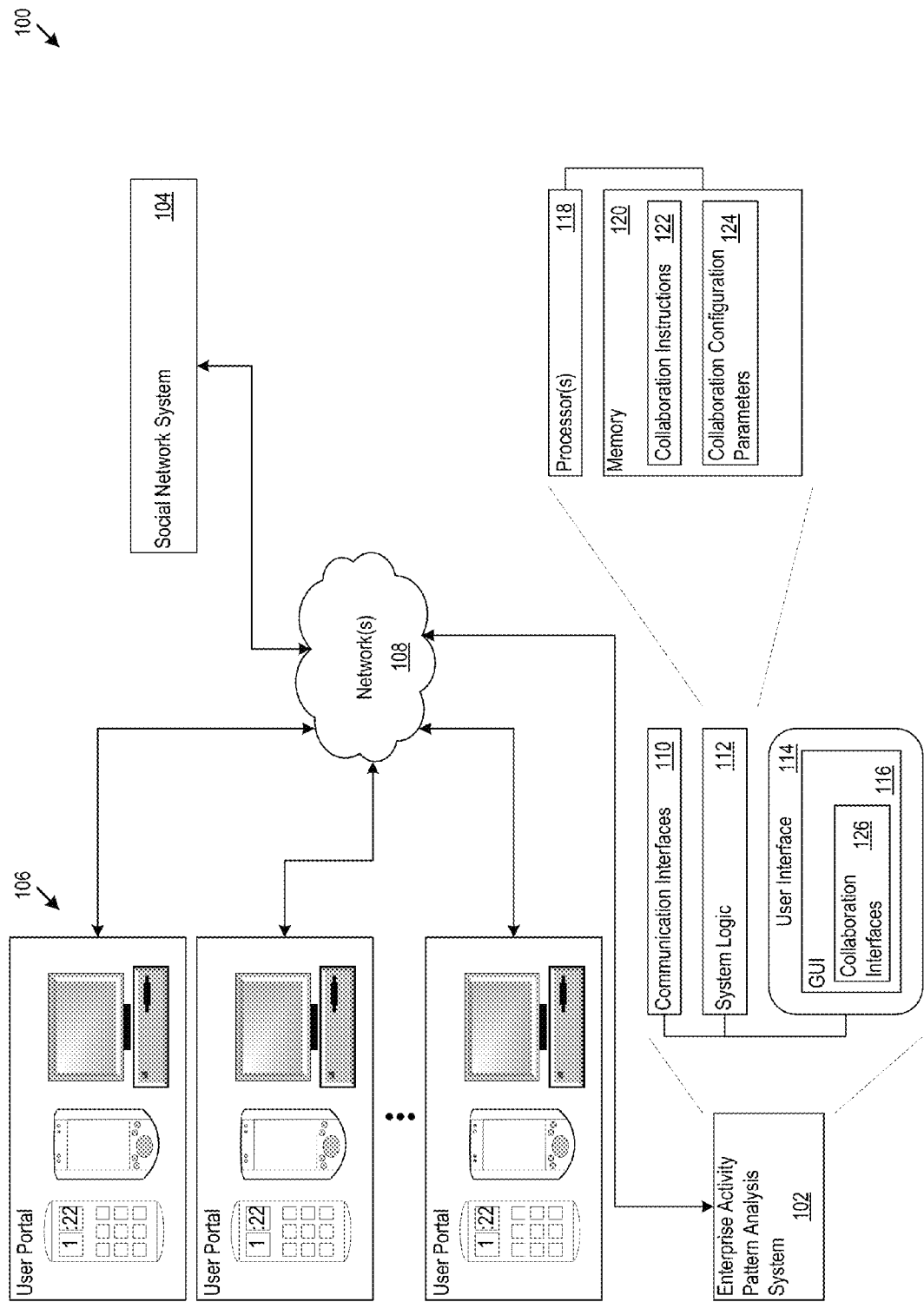
FIG. 1 shows an example of an enterprise activity pattern analysis architecture for facilitating enhanced collaboration using a social network platform.

FIG. 1 shows an example of an enterprise activity pattern analysis architecture 100 ("architecture 100") for facilitating enhanced collaboration using a social network platform. The architecture 100 includes an enterprise activity pattern analysis system 102, a social network system 104, and user portals 106, each of which is configured to communicate over any number or variety of communications network(s) 108. The user portals 106 may correspond to members of a project team or collaboration group using client applications, or other computer software applications, to perform a project or other activity. The client applications executed by the user portals 106 may be augmented via software plugins and widgets that provide activity pattern analysis and social collaboration functionality for the software applications. As examples, the client applications may include an enterprise social group space built on the social networking system 104. The client applications may also be an office suite application, e.g., Microsoft Office®, WordPerfect Office®, etc., or any other computer software applications. Alternatively or additionally, the user portals 106 may execute software natively written to provide the social collaboration functionality.

The user portals 106 may take many different forms. As examples, the user portals 106 may be smart phones, laptop computers, personal data assistants, pocket computers, tablet computers, portable email devices, or processes executed in memory by a processor. The user portals 106 may be found in virtually any context, including the home, business, public spaces, or automobile.

The activity pattern analysis system 102 analyzes and detects patterns in log data received from the social networking system 104 or from the client application itself. The log data may include activity data and/or structural/relationship data. Table 1 provides examples of the information that may be included in the activity data. Table 2 provides examples of the information that may be included in the structural/relationship data.

TABLE 1

Activity Data

| Document Oriented Data | Discussion Oriented Data | Task Data | Project Data | Calendar Data |
|---|---|---|---|---|
| Type Creation Views Edits Comments Completion Likes Shares Temporal patterns | Questions Answers Comments | Assigner Assignee Due date Progress Completion | Creation Members of Team Milestones/ goals | Type of Meeting Attendees |

TABLE 2

Structural/Relationship Data

| Employee Data | Relationship Data |
|---|---|
| Employee Organizational Data/Chart Employee Location Data Employee Expertise Data | Following Relationship Data Team Information Data Organizational Role Data |

The activity pattern analysis system 102 enhances the client applications visualizing the patterns detected in the log data and embedding those visualizations into the client applications as, for example, customized widgets. The activity pattern analysis system 102 may include communication interfaces 110 that connect the activity pattern analysis system 102 to the networks 108, system logic 112, and a user interface 114. The user interface 114 may display a graphical user interface 116. The user interface 114 facilitates setup, configuration, and monitoring of the activity pattern analysis system 102.

The system logic 112 implements in hardware, software, or both, any of the processing, user interfaces, reports, and other aspects of the system shown or described below or in the Figures. As one example, the system logic 112 may include one or more processors 118 and program and data memories 120. The program and data memories 120 hold, for example, collaboration instructions 122. The data and program memories 120 may also hold collaboration configuration parameters 124 that guide the operation of the collaboration system 112. The system logic 112 may also include one or more connectors, implemented in hardware and/or software that pull log data from the social networking system 104. The connectors may retrieve a dynamic stream of log data from the social networking system 104, or may access a data warehouse maintained by the social networking system that stores log data. The log data pulled from the dynamic feed may include more recent activity data, e.g., the past month, week, etc., while the data pulled from the data warehouse may extend farther back in time. The system may instruct the connectors to pull data from either source based on the type of widget being used. For example, some widgets discussed below provide analysis of data beginning with the creation of the analyzed content. For these widgets, the system may instruct the connectors to pull log data from the data warehouse. In other instances, only more recent log data may be relevant.

The processors 118 execute the collaboration instructions 122, and the configuration parameters 124 may inform the processors 118 as to how to handle the specific aspects of the collaboration processing described below and shown in the drawings. As a result, the processors 118 and collaboration instructions 122 implement the collaboration techniques described below and shown in the Figures. The activity pattern analysis system 102 may accept input from the user interface 114 to change, view, add, or delete any of the configuration parameters 124 at any time.

The social networking system 104 may be Jive®, Tibbr®, Moxie®, Chatter®, Yammer®, Newsgator® or other social network/micro-blogging systems. The social networking system 104 may host the client applications, as well as documents related to an enterprise social group space built on the social networking system 104. As users, via the user portals 106, interact with the enterprise social group space or documents uploaded to the group space, the social networking system 104 generates and provides the log data discussed above used by the system 102 for pattern analysis.

The social networking system 104 also generates updates based on the received event information and pushes the updates back to the activity pattern analysis system 102, or populates activity feeds embedded into the group space built on the social networking system. When the activity pattern analysis system 102 receives updates, it populates collaboration interfaces 126. While the collaboration interfaces 126 may appear on the GUI 116, the activity pattern analysis system 102 may also push the collaboration interfaces 126 (or updates thereto) to the user portals 106 over the networks 108.

The activity pattern analysis system 102 may populate multiple collaboration interfaces, each corresponding to a different user or user portal 106. For example, if a user completes a task or edits a document, the activity pattern analysis system 102 may send updates to the collaboration interfaces of other users that are part of the user's project team or collaboration group.

The activity pattern analysis system 102 may communicate with social networking system 104 through a communications network 108. The communications network 110 may be any private or public communications network or combination of networks. The communications network 108 connects devices, such as the user portals 106, servers, systems, databases, or other network enabled devices, to other such devices, and thereby supports data communication between the connected devices. The communications network 108 may generally be enabled to employ any form of computer-readable media for communicating information from one computing device to another. The communications network 108 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 108 may execute any communication method by which information may travel between computing devices.

The user portals 106 may access the activity pattern analysis system 102 via the communications network 110, for example, using a browser application. A browser based implementation allows system features to be accessible regardless of the underlying platform of the user portals 106. For example, the user portals 106 may each be a desktop, laptop, handheld computer, cell phone, mobile messaging device, network enabled television, digital video recorder, automobile, or other network enabled user portal, which may use a variety of hardware and/or software packages. The user portals 106 may also connect to the activity pattern analysis system 102 and social network system 104 using a stand-alone application which may be platform-dependent or platform-independent.

The activity pattern analysis system 102 may be implemented in many different ways. For example, although some features may be shown or described as stored in computer-readable memories (e.g., as logic implemented as computer-executable instructions or as data structures in memory), all or part of the activity pattern analysis system 102 and its logic and data structures may be stored on, distributed across, or read from other machine-readable media. The media may include hard disks, floppy disks, CD-ROMs, a signal, such as a signal received from a network or received over multiple packets communicated across the network.

The activity pattern analysis system 102 may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the activity pattern analysis system 102 may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that performs the collaboration processing described in this document and shown in the Figures.

FIG. 2 shows an example of an enterprise social group space 200 built on a social collaboration system enhanced with a custom widget 202. For the sake of explanation, the application discusses a group space built on Jive®, but it will be understood that other social networking platforms, such as those mentioned previously, may be used. An activity pattern analysis system, such as the system 102, determines, based on an analysis of log data received from the Jive® platform, recent users and their contributions, as well as their most frequently contributed Jive® content from the deployed container in a web page. The system publishes the determined information to the widget 202 embedded into the group space 200. The widget 202 may be configurable by admin to adjust the widget 202 height and labels. The widget may also include a configurable filter to restrict/allow the contents from the sub containers. The log data received from Jive®, e.g., from a Jive® activity manager service, includes a list of recent activities in a container, which provides a list of recent contents. If the administrator configures the widget 202 to select the recent activities from sub-containers like subspaces and projects, the system may use an activity manager service to retrieve the recent contents in the sub containers. The system, using the widget 202, finds the unique users in the filtered content list along with their recent content and most frequently worked content, thus providing a list of users and content details shown in the widget 202.

Figure 3:
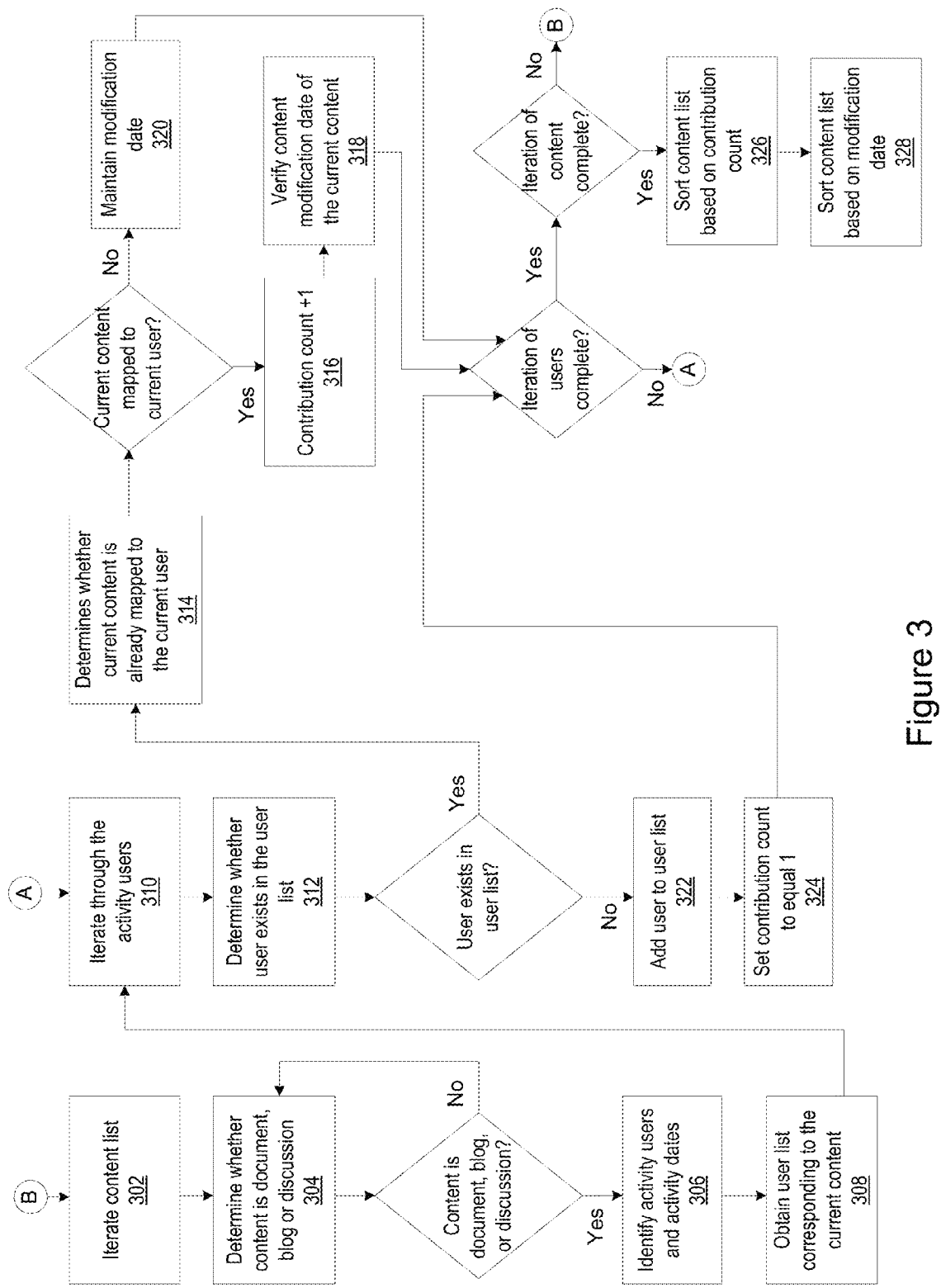
FIG. 3 shows a process by which the system may analyze log data from the social networking system to generate the information presented in the widget shown in FIG. 2.

FIG. 3 shows a process 300 by which the system may analyze log data from the social networking system to generate the information presented in the widget 202. The system iterates a content list received with the log data to fetch each content object (302). For the current content object, the system determines whether the content type is a document, blogs, or discussions type (304). If the current content type is of the document, blogs or discussion content type, the system fetches the content activity users and their activity date using the respective Jive® services (306). Activity users are users who have contributed in jive content in the form of create, edit or provide comments. The system maintains a user list for each content object. The system retrieves the user list corresponding to the current content object (308). The system iterates the recent activity users to retrieve each recent user associated with the current content object (310). For each user, the system verifies whether the user already exists in the user list (312).

If the current user already exists in the user list, the system verifies whether the current content is already mapped to the user (314). If the current content is already mapped to the current user, the system increments a contribution count associated with the content by one (316). The system also verifies the content modification date of the current content with existing entries (318). If the modification date for the current content more recent than an existing entry, the system updates the modification date for the current content to be the current content's modification date. If the modification date for the current content is not more recent than an existing entry, the system maintains the modification date of the existing entry as the modification date for this content.

If the current content is not mapped to the current user, the system maintains the modification date and the contribution count in the user list (320). If the current user is not present in the user list, the system adds the current user and the contribution date of the current user to the user list associated with the current content object (322), The system also sets a contribution count for the current user to one (324).

If the system has iterated through the user list, the system moves to the next content object in the content list. Once the iteration of the content list is complete, the system sorts the content list of each user based on contribution count (326). In the event of a tie, i.e., equal contribution count, the system sorts the content list based on modification date. In other words, if two entries in the list have the same contribution count, the entry with the more recent modification date will be listed on top as between the two. The system presents the sorted list in the widget 202 to display the user and the frequently contributed content, with the most frequently contributed-to content being listed first. The system sorts the content list of each user based on modification date (328). In the event of a tie, i.e., content with the same modification date, the system may look at the time of modification, if available, or may resolve such a tie based on contribution count. The system presents this sorted list in the widget 202 to display the user and the recently contributed content, with the most recently modified content being listed first.

As shown in FIG. 2, the widget includes radio buttons that allow the user to select between the two lists. When the user first opens the group page 200, the widget 202 may be configured to default to one list or the other. The system may also be configured to automatically update the widget with updated lists as the system processes new log data from the social networking system. In other words, the widget 202 may be configured to update or refresh with new information even while the user is using the group space page 200.

FIG. 4 shows another example of an enterprise social group space 400 built on a social collaboration system enhanced with a custom widget 402. Through the widget 402 the system allows a user of the group space 400 to retrieve and display recent Jive® contents 404, 406, 408 and the respective participated users 410, 412, 414, 416 within the deployed container. The contents 404, 406, 408 are displayed based on the descending order of user contribution count for the Jive content. The widget 402 identifies which users have contributed to which contents. Where there is more than one user that has contributed to a content, e.g., users 410 and 416 are both associated with content 406, the widget lists those users in descending order of number of participations. If there is a tie, the widget may show the user with the most recent participation. Where there are more users that have contributed to content than can fit in the widget display area, the widget 402 may show the users that have the most recent contributions. For example, if five users have contributed to certain content, but there is only room to display three, the system may show the three users with the most recent contribution. The widget 402 may be configurable by an administrator to adjust the widget height, labels and the background color. An administrator also has the provision to include the filter to restrict/allow the contents from the sub containers.

The log data received from Jive®, e.g., from a Jive® activity manager service, includes a list of recent activities in a container, which provides a list of recent contents. This service may be used to retrieve the list of recent contents. If the administrator configures the widget 402 to select the recent activities from sub-containers like subspaces and projects, the system may use an activity manager service to retrieve the recent contents in the sub containers. The widget 402 finds all the recent Jive® contents and the user participation list for each of the jive content based on the contribution count and the most recent participation date.

Figure 5:
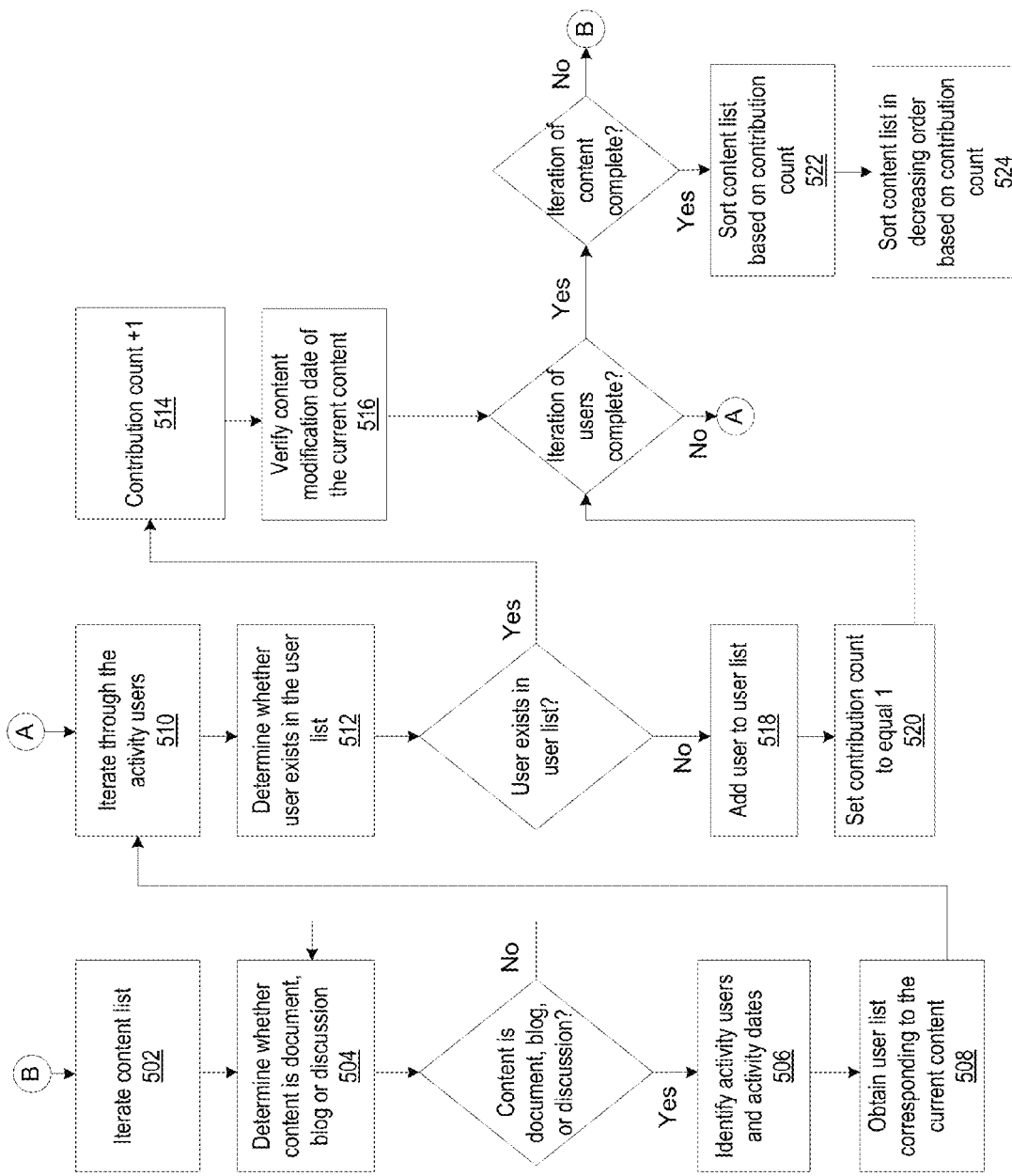
FIG. 5 shows a process by which the system may analyze log data from the social networking system to generate the information presented in the widget shown in FIG. 4.

FIG. 5 shows a process 500 by which the system may analyze log data from the social networking system to generate the information presented in the widget 402. The system iterates a content list received with the log data to fetch each content object (502). For the current content object, the system determines whether the content type is a document, blogs, or discussions type (504). If the current content type is of the document, blogs or discussion content type, the system fetches recent activity users and their contribution date to the content using the respective Jive® services (506). Activity users may be users who have contributed the current content in the form of, for example, creating, editing or providing comments. The system maintains a user list for each content object. The system retrieves the user list corresponding to the current content object (508). The system iterates the recent activity users to retrieve each recent user associated with the current content object (510). For each user, the system verifies whether the user already exists in the user list (512).

If the current user already exists in the user list, the system increments a contribution count associated with that user, for that content, by one (514). The system also verifies the contribution date of the current user with a previous contribution date of that user for the current content (516). If the contribution date of the current content by the current user is more recent than a previous contribution date of the content by the current user, the system updates the contribution date for the user in the user list to be the current modification date.

If the current user is not present in the user list, the system adds the current user and the contribution date of the current user to the user list associated with the current content object (518). The system also sets a contribution count for the current user to one (520).

If the system has iterated through the recent activity users, the system moves to the next content object in the content list. Once the iteration of the content list is complete, the system sorts the content list of each user based on total contribution count (522). In the event of a tie, i.e., equal contribution count, the system sorts the content list based on modification date. In other words, if two entries in the list have the same contribution count, the entry with the more recent modification date will be listed on top as between the two. The system presents the sorted list in the widget 402 to display the user and the frequently contributed content, with the most frequently contributed-to content being listed first. The system sorts the content list in decreasing order of contribution count (524). The system presents the sorted content in the widget 402 to display the user and the unique contents and contributing users. The widget 402 identifies the users in the form of avatars, but it will be understood that the users may be identified by name or by other mechanisms.

Figure 6:
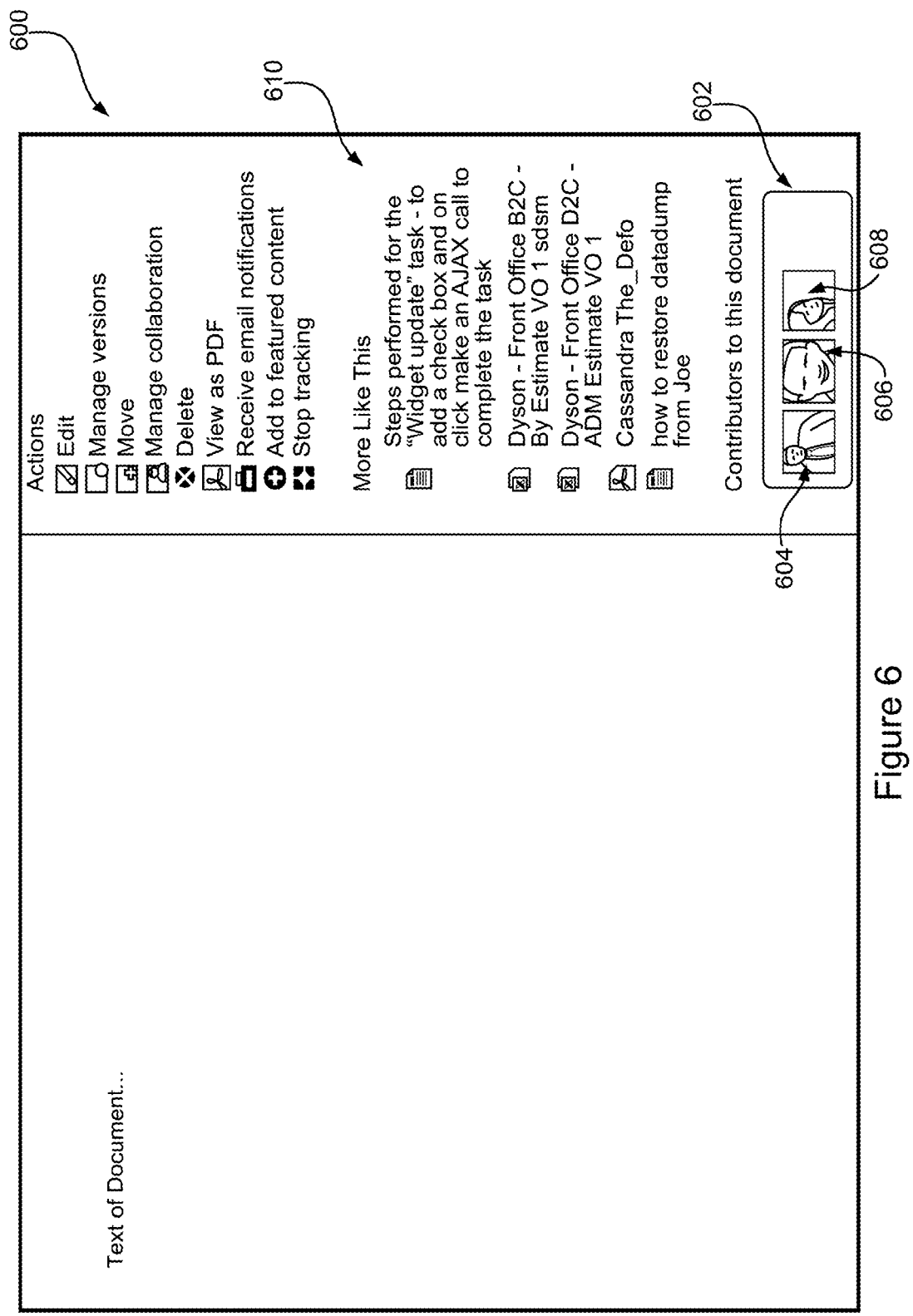
FIG. 6 shows an example of content of a social networking system enhanced with a custom widget.

FIG. 6 shows an example of content 600 of a social networking system enhanced with a custom widget 602. The widget 602 displays the unique contributors to the Jive® content, e.g., to a document, blog, or discussion, in the form of user avatars 604, 606, 608 on the Jive® content side panel 610. This list will include users that have created/edited/commented on this content 600 since the content was created. For the sake of explanation, the content in FIG. 6 is a document, but it will be understood the content can be of other types, such as blogs or discussions. The order in which the users are displayed may be according to the type of contribution made to the document 600. For example, the initial creator may be listed first, followed by users that made edits to the document, and then by users that added comments to the document. If the total number of users to be shown is more the number of slots that can fit in the widget 602, the system causes the widget to show the first X−1 individuals, where X is the number of slots that can fit in the window. The final slot may be represented by a blank box and on hover the box, a window pops up with all contributing users, or with all of the remaining contributing users. For example, if the widget has four slots, and there are five contributing users, the widget displays the first three contributing users and leaves the fourth slot blank. On hover the box, a window pops up with all five contributed users or with the remaining two contributing users.

Where the content is a document, the system receives the document author and a list of activity authors, as well as a list of users who have commented on the document, from the log data provided by the social networking system. Where the content is a discussion, the system receives from the log data an identification of a main discussion creator and an identification of the users that have replied to the main thread.

Figure 7:
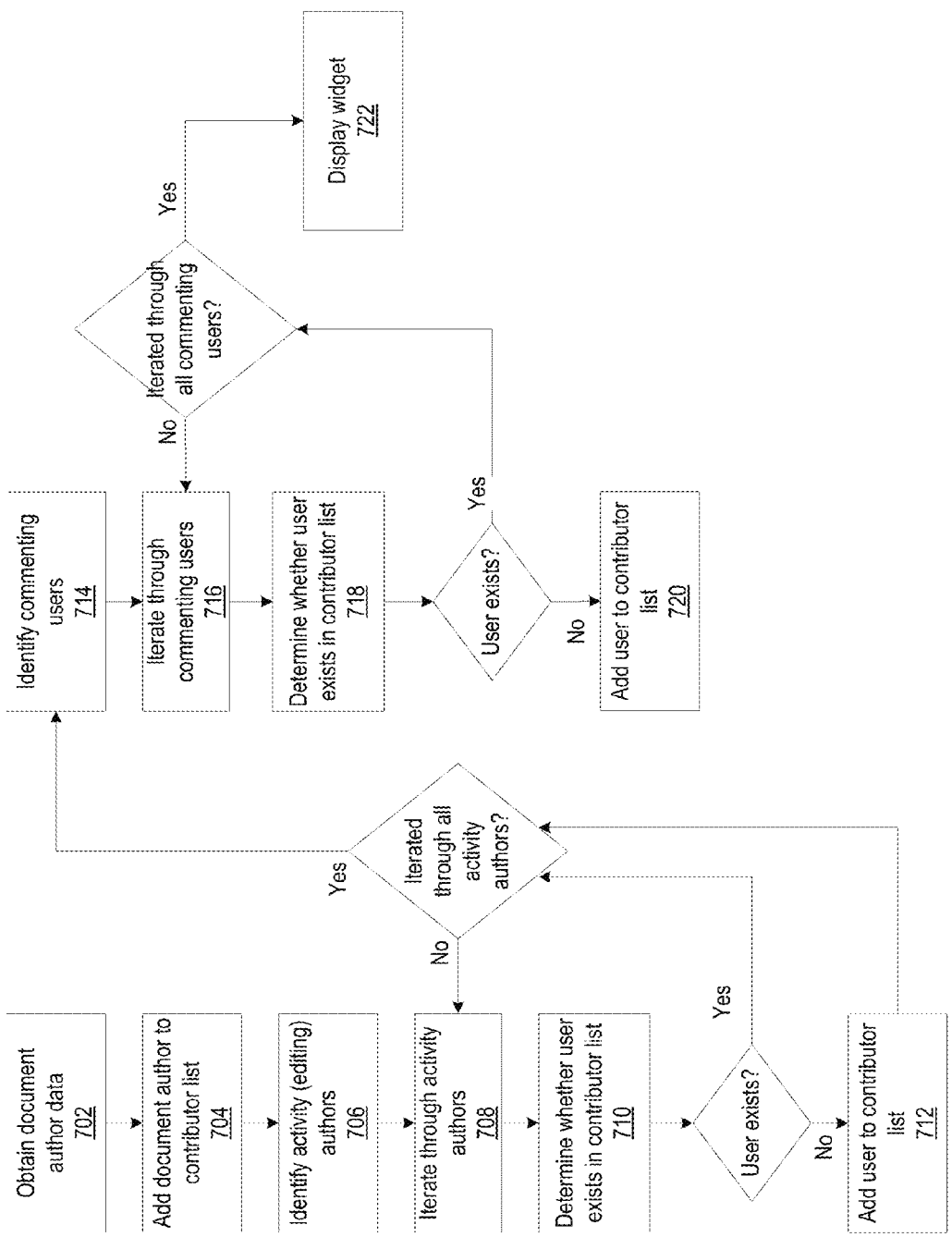
FIG. 7 shows a process by which the system may analyze log data from the social networking system to generate the information presented in the widget of FIG. 6.

FIG. 7 shows a process 700 by which the system may analyze log data from the social networking system to generate the information presented in the widget 602 where the content is a document. The system obtains an identification of a document author form the log data (702). The system adds the user to a document contributor list associated with the document (704). The system may maintain a document contributor list for each document. The system obtains an identification of document activity authors to fetch the users who have edited the document (706). Document activity authors may be authors that have edited the document.

The system iterates through the list of activity authors to fetch the corresponding user data (708). For each activity author, the system determines whether the corresponding user already exists in the document contributor list (710). If the user does not exist in the document contributor list, the system adds the user to the document contributor list (712). If the user already exists in the document contributor lists, the system advances to the next activity author until the system has iterated through all activity authors.

The system obtains a list of commenting users from the log data (714). The system iterates through the list of activity authors to fetch the corresponding user data (716). For each commenting user, the system determines whether the commenting user already exists in the document contributor list (718). If the user does not exist in the document contributor list, the system adds the user to the contributor list (720). If the user already exists in the document contributor list, the system advances to the next commenting user until the system has iterated through all commenting users. The system may maintain a flag or other key associated with each user in the document contributor list to identify which users in the list is the document creator, an editing user, or a commenting user. The system publishes the data in the document contributor list as the widget 602. The order in which the contributor are presented may be based on the type of user the contributor is, i.e., author, editor, commenter. The system retrieves avatars associated with each of the contributing users and displays the avatars in the order determined by the above analysis (722).

Figure 8:
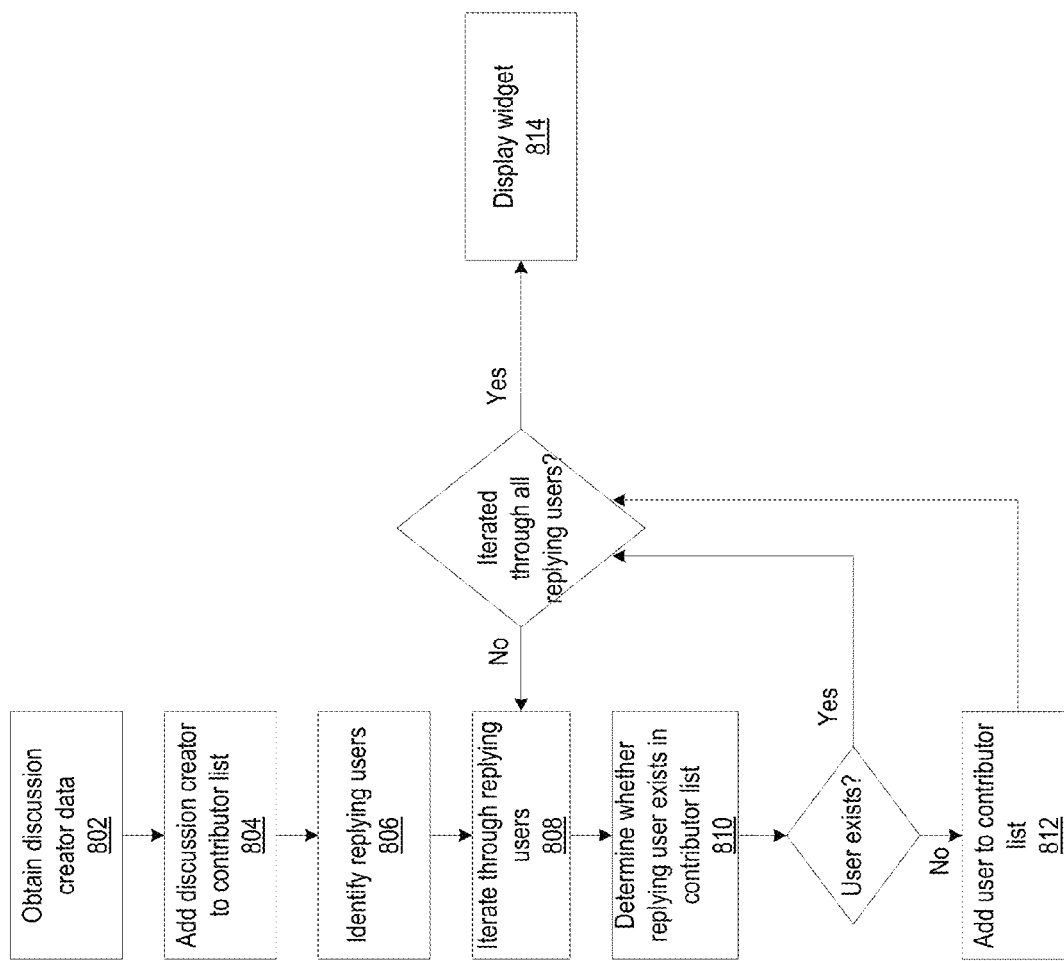
FIG. 8 shows a process by which the system may analyze log data from the social networking system to generate the information presented in the widget of FIG. 6.

FIG. 8 shows a process 800 by which the system may analyze log data from the social networking system to generate the information presented in the widget 602 where the content is a discussion. The system obtains an identification of the discussion author, or creator, from the log data (802). The system adds the discussion author, or creator, to a discussion contributor list (804). The system may maintain a discussion contributor list for each discussion.

The system obtains a list of users that have replied to the discussion from the log data (806). The system iterates through the list of replying users to fetch the corresponding user data (808). For each replying user, the system determines whether the user already exists in the discussion contributor list (810). If the user does not exist in the discussion contributor list, the system adds the user to the list (812). If the user already exists in the discussion contributor list, the system advances to the next replying user until the system has iterated through all replying users. The system publishes the data in the discussion contributor list as the widget 602 onto the corresponding discussion page of the social networking system (814). The system retrieves avatars associated with each of the users. The discussion creator may be listed first, followed by replying users. The replying users may be presented in ascending or descending order based on the date of their most recent reply.

Figure 9:
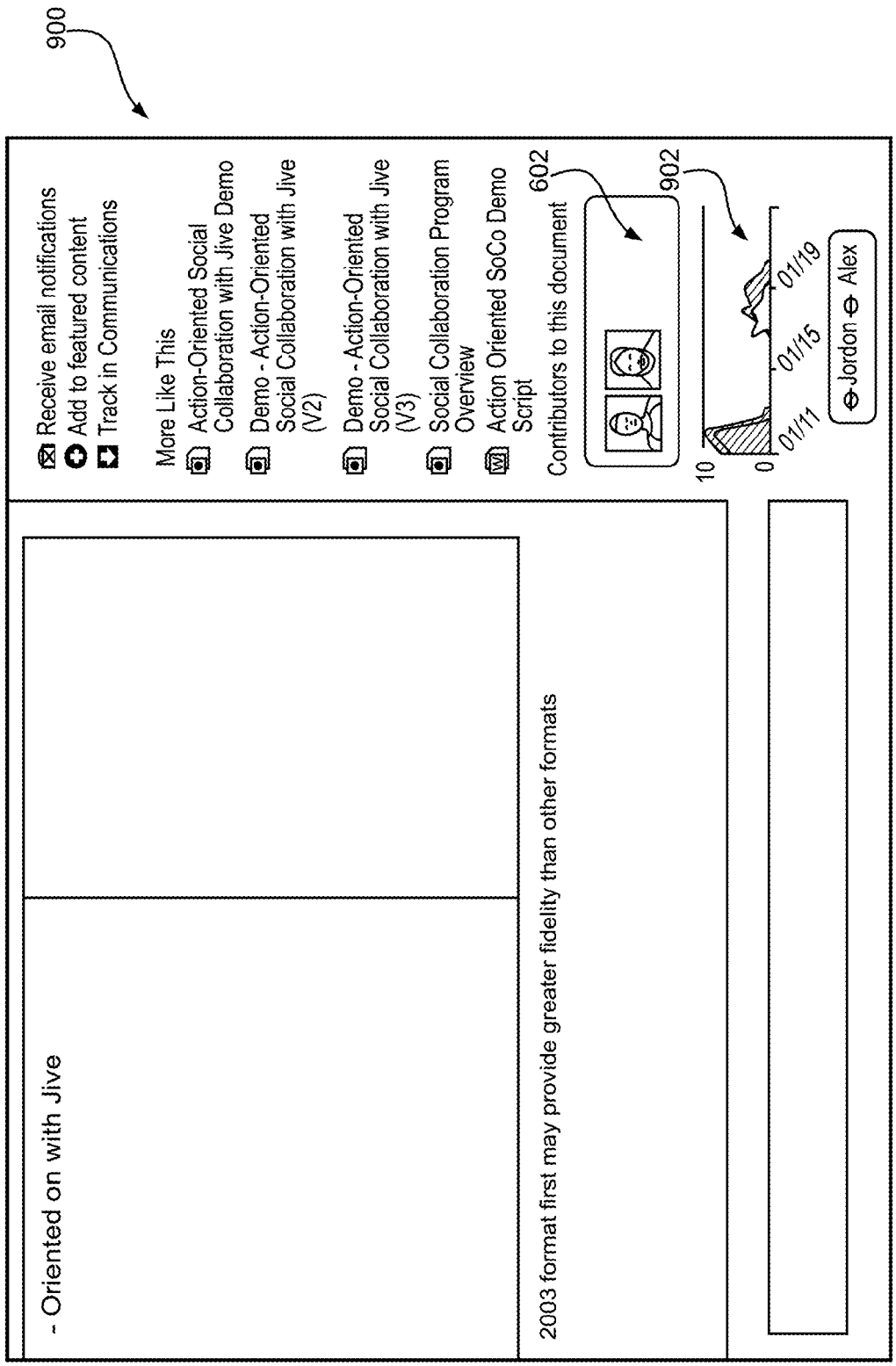
FIG. 9 shows another example of content of a social networking system enhanced with a custom widget.

FIG. 9 shows another example of content 900 of a social networking system enhanced with a custom widget 902 on the Jive® document side panel 904. Similar to the widget 602, the widget 902 may be embedded into social networking content, such as into a document or discussion. The content shown in FIG. 9 is a document.

The widget 902 provides a graph with a real-time interactive visualization. In particular, the widget 902 provides a time vs. contribution score graph for each user. The x-axis corresponds to time, with the starting point of the x-axis being the creation of the document and the ending point being the date the document is being viewed. The y-axis corresponds to a contribution score. The contribution score is calculated per day, per user; it is the sum of points assigned to each contributing user, per day, based on whether the user is the document creator or has edited or commented on the document. The following is an example of the point scheme that may be employed: If a user is the initial creator, the user gets 4 points assigned on the creation date; if a user edits that document, the user gets 3 points for each edit assigned on the edit date; and if a person comments on the document, the user gets 2 point for each comment assigned on the comment date. Where the content is a discussion, the point scheme may assign points for creation of the discussion and points for replying to the discussion.

The log data, provided by the Jive® document manager and comment manager, includes user details and activity data. The widget 902 processes the data to get the X co-ordinate and the respective contribution score for each user. The widget 902 may passes the processed data to high chart jquery script to display the graph.

Figure 10:
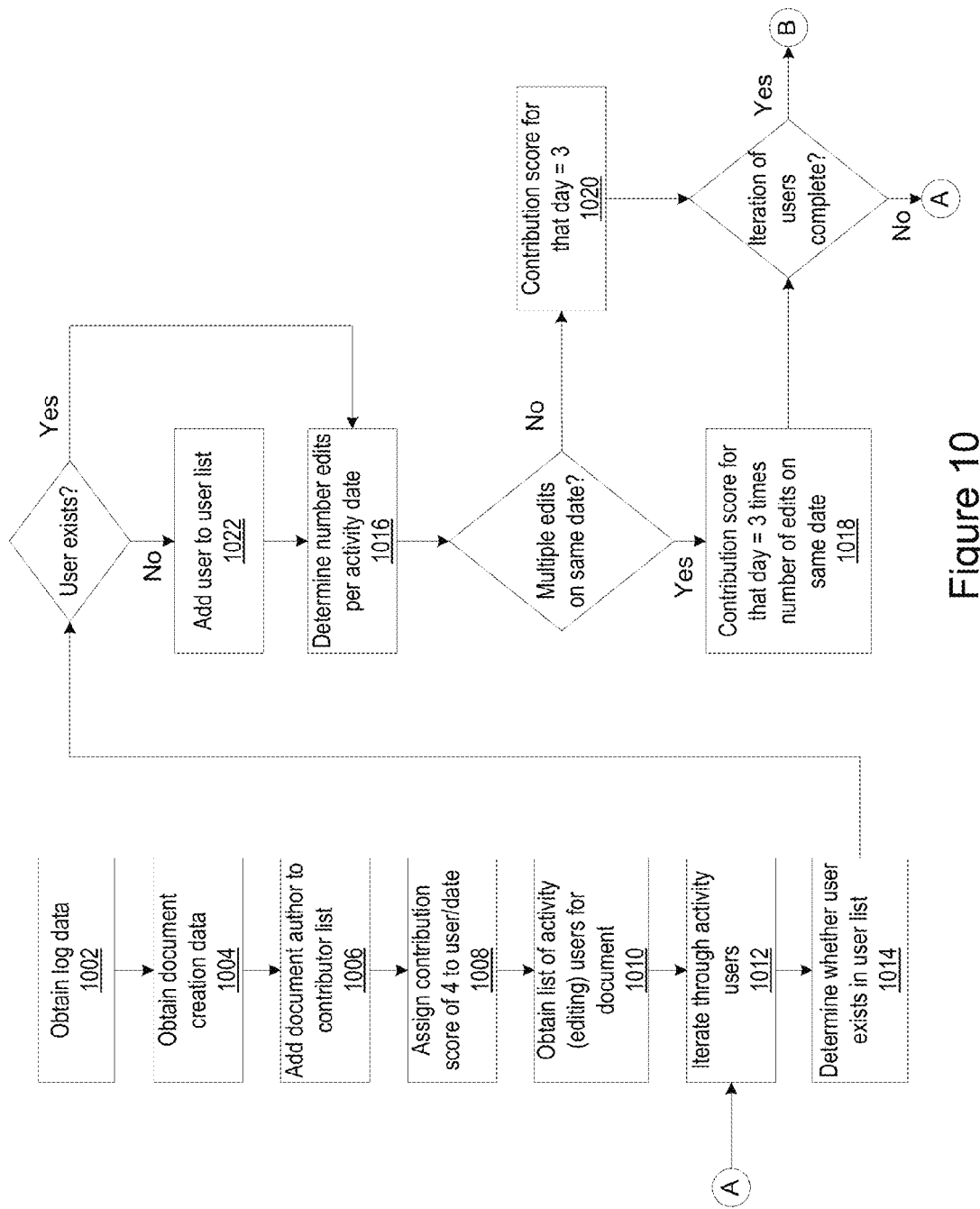
FIGS. 10-11 show a process by which the system may analyze log data from the social networking system to generate the information presented in the widget where the content is a document.
Figure 11:
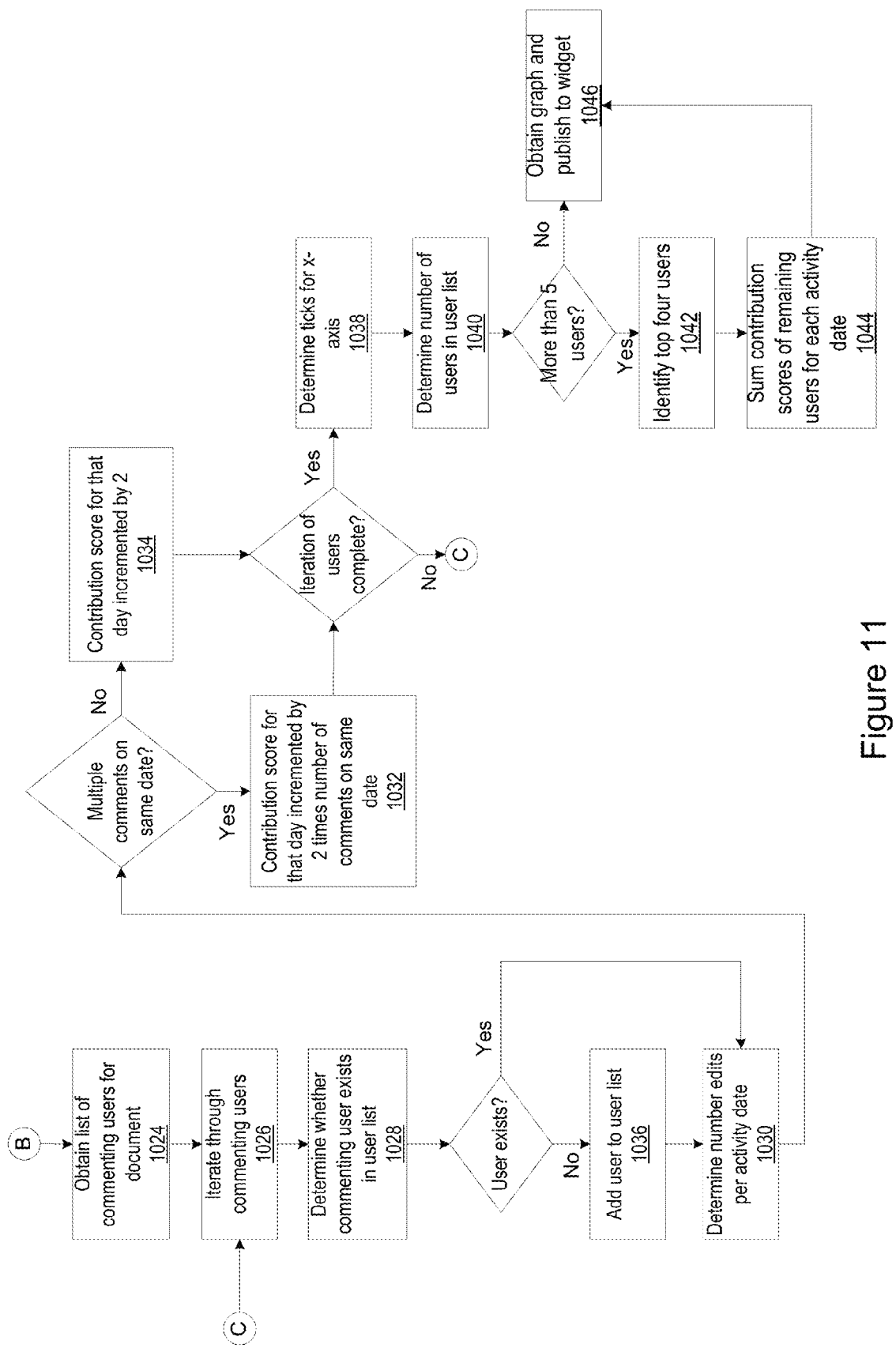

FIGS. 10-11 show a process 1000 by which the system may analyze log data from the social networking system to generate the information presented in the widget 902 where the content is a document. For the sake of explanation, the process 1000 is described as having a contribution score point scheme of four points for document creation, three points for editing, and two points for commenting, but it will be understood that other point schemes may be used.

The system obtains log data from the social networking system (1002), and extracts document creation data from the log data (1004). The document creation data may include the document creator, the document creation date, and a last modification date. The system adds the document creator to a user list associated with the document (1006) and assigns a contribution score of four to the user on the document creation date (1008).

The system obtains a list of activity users and activity dates corresponding to the document (1010). An activity user is a user that has edited the document. The system iterates through the list of activity users to retrieve each user and activity date (1012). For each user, the system determines whether the user already exists in the user list (1014). If user exists, the system identifies the activity dates corresponding to the user, i.e., each date on which the user edited the document, and determines how many edits the activity user made on each activity date corresponding to the user (1016). If the user has made multiple edits on a given activity date, the system assigns a contribution score for that user on that date equal to three times the number of edits made that given date (1018). For activity dates on which the activity user made one edit, the system assigns a contribution score of three for that user on that date (1020). If the user does not exist in the user list, the system adds the user to the user list (1022) and then performs steps 1016-1020.

The system obtains a list of comment users and comment dates corresponding to the document from the log data (1024). A comment user is a user that has commented on the document. The system iterates through the list of comment users to retrieve each user and comment date (1026). For each comment user, the system determines whether the comment user already exists in the user list (1028). If comment user exists in the user list, the system identifies the comment dates corresponding to the comment user, i.e., each date on which the user commented on the document, and determines how many commenting contributions the comment user made on each activity date (1030). If the comment user has made multiple commenting contributions on a given activity date, the system increases a contribution score for that user on that date by two times the number of comment contributions made that given date (1032). For comment dates on which the comment user made one contribution, the system increases a contribution score for that user on that comment date by two (1034). If the comment user does not exist in the user list, the system adds the comment user to the user list (1036) and then performs steps 1030-1034. According to the above, if a user edited and commented on the document on the same date, the user would have a contribution score of five for that date.

The system determines the ticks to be displayed on the x-axis of the graph in the widget 902 (1038). The system determines the number of users in the user list (1040). If there are more than five users in the user data list, the system sort the list based on contribution score in the descending order and retrieves contribution scores for the first four users (1042). The system designates the remaining users as "Others" and sums the contribution score for "Others" for each activity date (1044). The system passes the processed data (collaboration scores per date for the first four users and the cumulative scores per date for the "Others") to the jquery highchart JavaScript file and displays the resulting graph to the widget 902 (1046).

Figure 12:
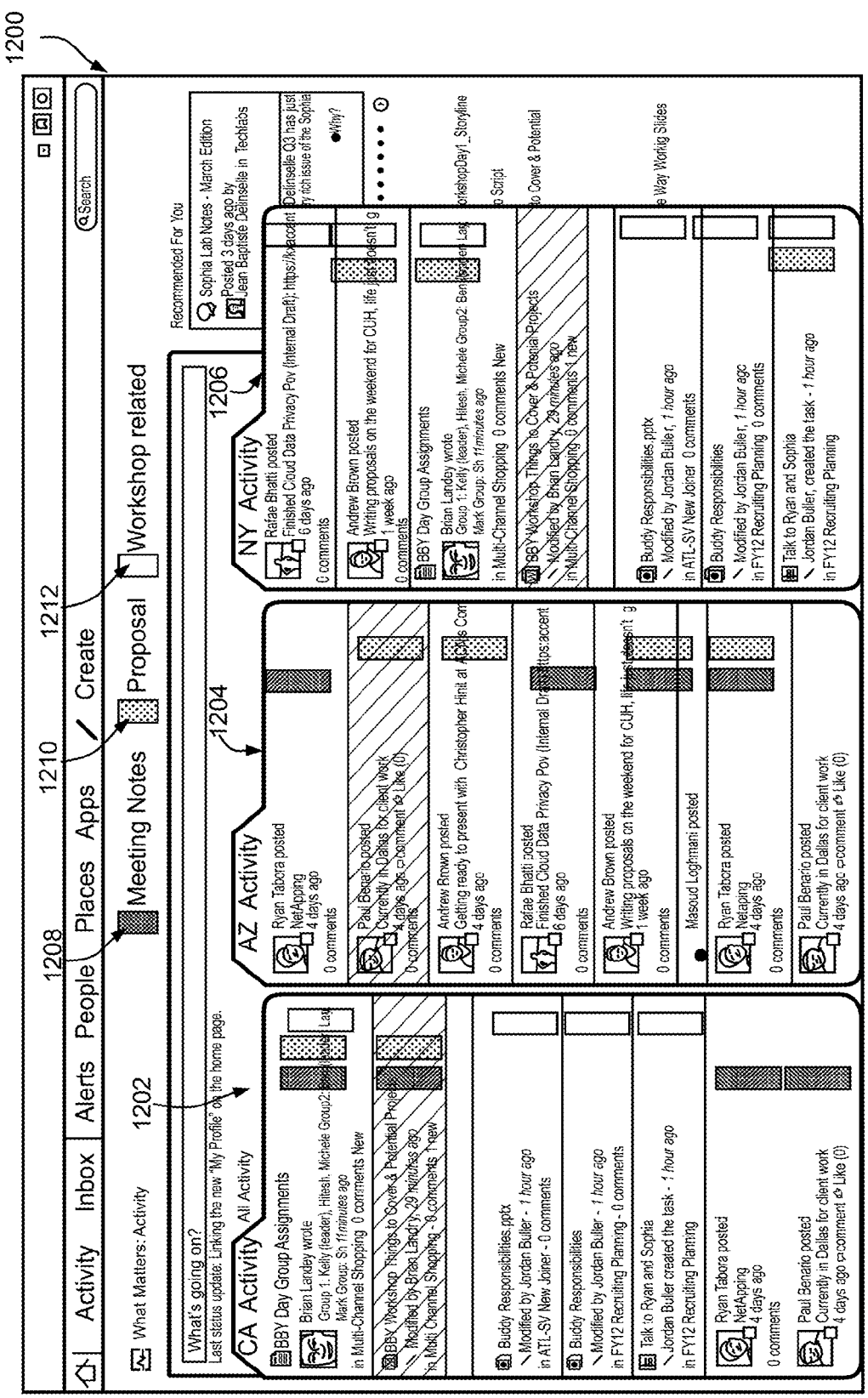
FIG. 12 shows parallel team activity streams embedded into a page of a group space built on a social networking system.

FIG. 12 shows parallel team activity streams 1202, 1204, 1206, embedded into a page 1200 of a group space built on a social networking system. The system obtains location and activity data from the log data and separates the data by location such that each activity stream corresponds to a different location. Each activity stream also categorizes the type of activity being populated to the feed. FIG. 12 shows three types of activity: meeting notes 1208, proposal 1210, and workshop related 1212. Each type of activity is characterized by a color shading, and each feed item related to a particular activity type is overlaid with a box or other shape of the appropriate color. The activity type may be determined manually user that is the subject of the feed entry, or may parse the text of feed entry to determine what type of activity is involved.

Figure 13:
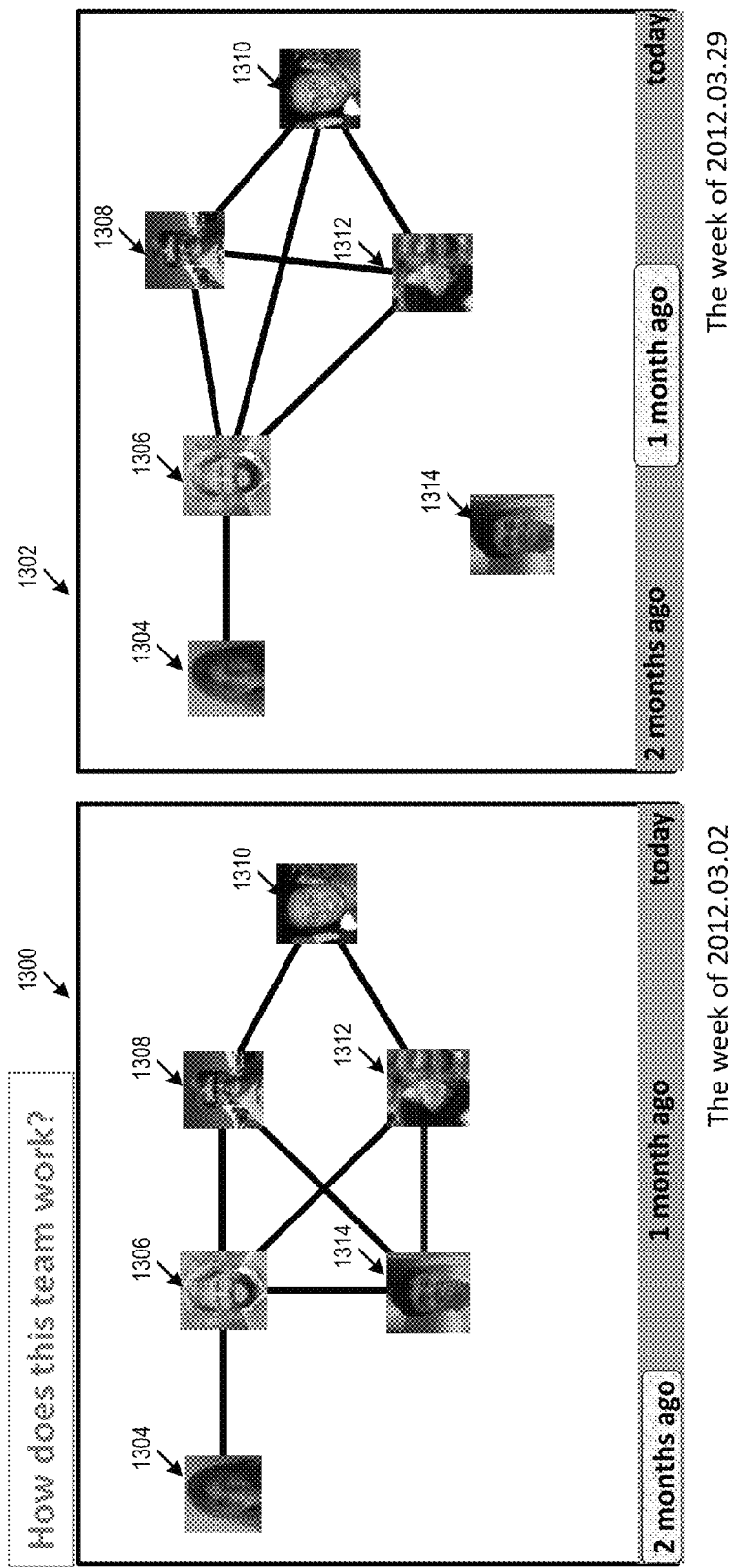
FIG. 13 shows two instances of an intra-team collaborative topology visualizer widget.

FIG. 13 shows two instances 1300 and 1302 of an intra-team collaborative topology visualizer widget. The widget illustrates collaboration patterns within a project team over a different time period. The widget includes avatars 1304, 1306, 1308, 1310, 1312, 1314 corresponding to each team member. The lines between team members illustrate which team members have been collaborating on the same work product, and illustrates the group structure and how projects being worked on. The system determines where to draw the lines based on a pattern analysis of the log data received from one or more social networking platforms. The system determines the collaboration relationship over multiple time periods. In FIG. 13, a user can select a collaboration relationship from two months prior, one month prior or the current collaboration relationship. The instance 1300 of the widget shows a collaboration relationship from two months prior, while the instance 1302 of the widget shows a collaboration relationship from one month prior.

FIG. 14 shows recommendations widget 1402 that may be embedded into a group space 1400 built on a social networking platform. The widget 1402 provides a prioritized feed of recommended content 1404 to the user. The feed is sorted in order of relevance to the user, with the most relevant content, as determined by the system's pattern analysis, being listed as the first entry in the feed. The feed may be tailored to the user. In other words, the prioritized feed may be different based on which user is logged into and viewing the group space. The system analyzes collaboration patterns based on the log data to determine which content, and which authors, is relevant to which users, and prioritizes the feed based on that analysis. For example, the system determines that two users frequently work on the same work product. Accordingly, the top of each user's prioritized feed may include recommendations to review the other user's work product. The prioritized feed may also be based on determined high performing behavior.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An enterprise activity pattern analysis system, comprising:
    a processor; and
    a memory in communication with the processor, the memory comprising:
    instructions that, when executed, cause the processor to:
        retrieve log data from at least one social networking system, the log data comprising information characterizing user interactions with a team group space hosted by the social networking system;
        analyze the log data to detect patterns in the user interactions and generate information for publication to an interface component;
        configure first interface component to have an adjustable height and adjustable labels and embed the first interface component into the group space, wherein the first interface component comprises a visual representation of a first pattern analysis of the log data and presents the information generated based on analysis of the log data, the first interface component comprising a configurable filter to restrict or allow contents;
        update and refresh the first interface component with new information as new log data from the social networking system is processed; and
        embed a second interface component into a document uploaded to the group space, wherein the second interface component comprises a visual representation of a second pattern analysis of the log data, the log data comprising a document author, a list of activity authors, and a list of users who have commented on the document;
        wherein the second interface component displays the users who have commented on the document in the order in which an initial creator of the document is listed first, followed by a user that makes edits to the document, and then by a user that adds comments to the document.

2. The system of claim 1, wherein the first interface component comprises a dynamic listing of content objects associated with the group space ranked according to the frequency that users have contributed to the content.

3. The system of claim 2, wherein the first interface component further comprises:
    a listing of users for each content object, wherein each listing of users is ranked according the amount of contribution to the respective content object.

4. The system of claim 1, wherein the second interface component comprises a graph embedded into the document in which an x-axis corresponds to time and a y-axis corresponds to a contribution score.

5. The system of claim 1, wherein the first interface component comprises a listing of recommended content based on the first pattern analysis.

6. A product, comprising:
    a non-transitory computer-readable medium comprising instructions that, when executed, cause a computer processor to:
    retrieve log data from at least one social networking system, the log data comprising information characterizing user interactions with a team group space hosted by the social networking system;
    analyze the log data to detect patterns in the user interactions and generate information for publication to an interface component;
    configure a first interface component to have an adjustable height and adjustable labels and embed the first interface component into the group space, wherein the first interface component comprises a visual representation of a first pattern analysis of the log data and presents the information generated based on analysis of the log data, the first interface component comprising a configurable filter to restrict or allow contents;
    update and refresh the first interface component with new information as new log data from the social networking system is processed, and
    embed a second interface component into a document uploaded to the group space, wherein the second interface component comprises a visual representation of a second pattern analysis of the log data, the log data comprising a document author, a list of activity authors, and a list of users who have commented on the document;
    wherein the second interface component displays the users who have commented on the document in the order in which an initial creator of the document is listed first, followed by a user that makes edits to the document, and then by a user that adds comments to the document.

7. The system of claim 6, wherein the first interface component comprises a dynamic listing of content objects associated with the group space ranked according to the frequency that users have contributed to the content.

8. The system of claim 7, wherein the first interface component further comprises:
    a listing of users for each content object, wherein each listing of users is ranked according the amount of contribution to the respective content object.

9. The system of claim 6, wherein the second interface component comprises a graph embedded into the document in which an x-axis corresponds to time and a y-axis corresponds to a contribution score.

10. The system of claim 6, wherein the first interface component comprises a listing of recommended content based on the first pattern analysis.

11. A method for analyzing enterprise activity patterns, comprising:
    retrieving log data from at least one social networking system, the log data comprising information characterizing user interactions with a team group space hosted by the social networking system;
    analyzing, using a computer processor, the log data to detect patterns in the user interactions and generate information for publication to an interface component;
    configuring a first interface component to have an adjustable height and adjustable labels and embedding the first interface component into the group space, wherein the first interface component comprises a visual representation of a first pattern analysis of the log data and presents the information generated based on analysis of the log data, the first interface component comprising a configurable filter to restrict or allow contents;
    updating and refreshing the first interface component with new information as new log data from the social networking system is processed; and
    embedding a second interface component into a document uploaded to the group space, wherein the second interface component comprises a visual representation of a second pattern analysis of the log data, the log data comprising a document author, a list of activity authors, and a list of users who have commented on the document;
    wherein the second interface component displays the users who have commented on the document in the order in which an initial creator of the document is listed first, followed by a user that makes edits to the document, and then by a user that adds comments to the document.

12. The method of claim 11, wherein embedding the first interface component comprises a generating a dynamic listing of content objects associated with the group space ranked according to the frequency that users have contributed to the content.

13. The method of claim 12, wherein embedding the first interface component further comprises:
    generating a listing of users for each content object, wherein each listing of users is ranked according the amount of contribution to the respective content object.

14. The method of claim 11, wherein embedding the second interface component comprises generating a graph embedded into the document in which an x-axis corresponds to time and a y-axis corresponds to a contribution score.

15. The method of claim 11, wherein embedding the first interface component comprises generating a listing of recommended content based on the first pattern analysis.

* * * * *